(12) United States Patent
Gaither et al.

(10) Patent No.: US 10,953,807 B2
(45) Date of Patent: Mar. 23, 2021

(54) HIDEAWAY ROOF RACK FOR FUEL ECONOMY

(71) Applicant: Toyota Motor Engineering & Manufacturing North America, Inc., Plano, TX (US)

(72) Inventors: Geoffrey David Gaither, Brighton, MI (US); Takanori Aoki, Ann Arbor, MI (US); Abril Galang, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/129,701

(22) Filed: Sep. 12, 2018

(65) Prior Publication Data

US 2020/0079293 A1 Mar. 12, 2020

(51) Int. Cl.
*B60R 9/045* (2006.01)

(52) U.S. Cl.
CPC .................................. *B60R 9/045* (2013.01)

(58) Field of Classification Search
CPC .............. B60R 9/045; B60R 9/04; B60T 1/16
USPC .................................................. 224/321, 309
See application file for complete search history.

(56) References Cited

U.S. PATENT DOCUMENTS

| 3,044,823 | A | * | 7/1962 | Oishei | ...................... | E05F 15/57 |
| | | | | | | 296/63 |
| 3,165,353 | A | * | 1/1965 | Weise | ....................... | B60R 9/04 |
| | | | | | | 296/210 |
| 3,596,974 | A | * | 8/1971 | Adams | .................. | B62D 35/002 |
| | | | | | | 296/180.2 |
| 4,362,258 | A | * | 12/1982 | French | ...................... | B60J 7/165 |
| | | | | | | 224/309 |
| 4,779,915 | A | * | 10/1988 | Straight | ............... | B62D 35/001 |
| | | | | | | 296/180.3 |

(Continued)

FOREIGN PATENT DOCUMENTS

| DE | 2942142 A | * | 4/1981 | ................ B60T 1/16 |
| EP | 1533186 A2 | * | 5/2005 | ................ B60R 9/04 |

(Continued)

OTHER PUBLICATIONS

Gearlog "Chrysler's Fuel-Saving Retractable Roof Rack" www.geek.com/author/gearlog; 4 pages, Mar. 11, 2011.

*Primary Examiner* — Nathan J Newhouse
*Assistant Examiner* — Lester L Vanterpool
(74) *Attorney, Agent, or Firm* — Snell & Wilmer LLP

(57) ABSTRACT

A vehicle includes a body having a roof that defines a volume and includes a top surface. The vehicle further includes a plurality of support members. The vehicle further includes a plurality of actuators each coupled to at least one of the plurality of support members. The vehicle further includes an input device configured to receive user input corresponding to a desired roof rack configuration. The vehicle further includes an electronic control unit (ECU) coupled to the plurality of actuators and to the input device and configured to control the plurality of actuators to actuate at least one of the plurality of support members to be in a raised position in which it extends above the top surface of the roof or to be in a stored position in which it is located in the volume based on the desired roof rack configuration.

20 Claims, 12 Drawing Sheets

(56) References Cited

U.S. PATENT DOCUMENTS

| | | | | |
|---|---|---|---|---|
| 4,810,022 | A * | 3/1989 | Takagi | B62D 35/005 296/180.5 |
| 4,824,165 | A | 4/1989 | Fry | |
| 4,981,319 | A * | 1/1991 | Gerzeny | B60J 7/165 296/165 |
| 5,096,106 | A * | 3/1992 | Foster | B60R 9/045 16/349 |
| 5,538,316 | A * | 7/1996 | Bartholomew | B62D 35/001 296/180.3 |
| 5,749,439 | A * | 5/1998 | Van Maanen | F16H 57/0412 184/104.1 |
| 6,029,873 | A * | 2/2000 | Won | B60R 9/04 224/309 |
| 6,126,220 | A * | 10/2000 | Brasher | B60P 1/286 296/26.04 |
| 6,183,041 | B1 * | 2/2001 | Wilson | B60J 1/20 296/180.1 |
| 6,193,302 | B1 * | 2/2001 | Won | B62D 35/007 296/180.1 |
| 6,332,637 | B1 * | 12/2001 | Chambers | B62D 33/08 296/26.04 |
| 6,415,970 | B1 | 7/2002 | Kmita et al. | |
| 6,769,728 | B2 * | 8/2004 | Albaisa | B60R 9/04 224/309 |
| 7,118,165 | B2 * | 10/2006 | Nelson | B62D 33/0276 296/186.2 |
| 7,422,130 | B2 * | 9/2008 | Shaukat | B60R 9/045 224/309 |
| 7,699,372 | B2 * | 4/2010 | Adams | B60R 9/055 224/324 |
| 7,798,381 | B2 * | 9/2010 | Moreau | B60R 9/045 224/314 |
| 8,100,306 | B2 * | 1/2012 | Gerhardt | B60R 9/045 224/282 |
| 8,167,179 | B2 * | 5/2012 | Thomas | B60R 9/045 224/321 |
| 8,328,057 | B2 | 12/2012 | Johnson et al. | |
| 8,424,733 | B2 | 4/2013 | Polewarczyk et al. | |
| 8,757,700 | B2 * | 6/2014 | Hicks | B62D 37/02 296/180.1 |
| 8,978,946 | B2 * | 3/2015 | Gerhardt | B60R 9/052 224/321 |
| 9,150,159 | B1 * | 10/2015 | Meszaros | B60R 9/045 |
| 10,118,562 | B2 * | 11/2018 | Gutierrez Gaspar | B62D 25/04 |
| 10,242,519 | B2 * | 3/2019 | Nagler | G07C 9/00309 |
| 2002/0125728 | A1 * | 9/2002 | Chambers | B62D 33/08 296/3 |
| 2003/0090126 | A1 * | 5/2003 | Adams | B62D 35/007 296/180.1 |
| 2003/0141735 | A1 * | 7/2003 | Albaisa | B60R 9/04 296/37.7 |
| 2004/0135393 | A1 | 7/2004 | Neuer et al. | |
| 2004/0195866 | A1 * | 10/2004 | Fin | B60R 9/045 296/210 |
| 2006/0196905 | A1 * | 9/2006 | Shaukat | B60R 9/045 224/321 |
| 2007/0039985 | A1 * | 2/2007 | Warren | B60R 9/04 224/321 |
| 2007/0075108 | A1 * | 4/2007 | Stapleton | B60R 9/045 224/321 |
| 2008/0149675 | A1 * | 6/2008 | Moreau | B60R 9/045 224/320 |
| 2008/0272624 | A1 * | 11/2008 | Donicke | B60R 9/045 296/216.01 |
| 2012/0074187 | A1 * | 3/2012 | Gobart | B60R 9/045 224/321 |
| 2012/0125961 | A1 * | 5/2012 | Gobart | B60R 9/045 224/321 |
| 2013/0110346 | A1 * | 5/2013 | Huber | G08G 1/165 701/33.9 |
| 2016/0023693 | A1 * | 1/2016 | Wolf | B60K 11/02 296/180.5 |
| 2016/0137163 | A1 * | 5/2016 | Menard | B60R 25/00 701/23 |
| 2017/0369106 | A1 * | 12/2017 | Williams | G01S 7/4813 |
| 2018/0120863 | A1 * | 5/2018 | Barra | B60J 7/08 |

FOREIGN PATENT DOCUMENTS

| | | | |
|---|---|---|---|
| EP | 2048033 A1 | 4/2009 | |
| FR | 2713568 A1 * | 6/1995 | B60R 9/04 |
| JP | 2019018727 A * | 2/2019 | B62D 37/02 |

* cited by examiner

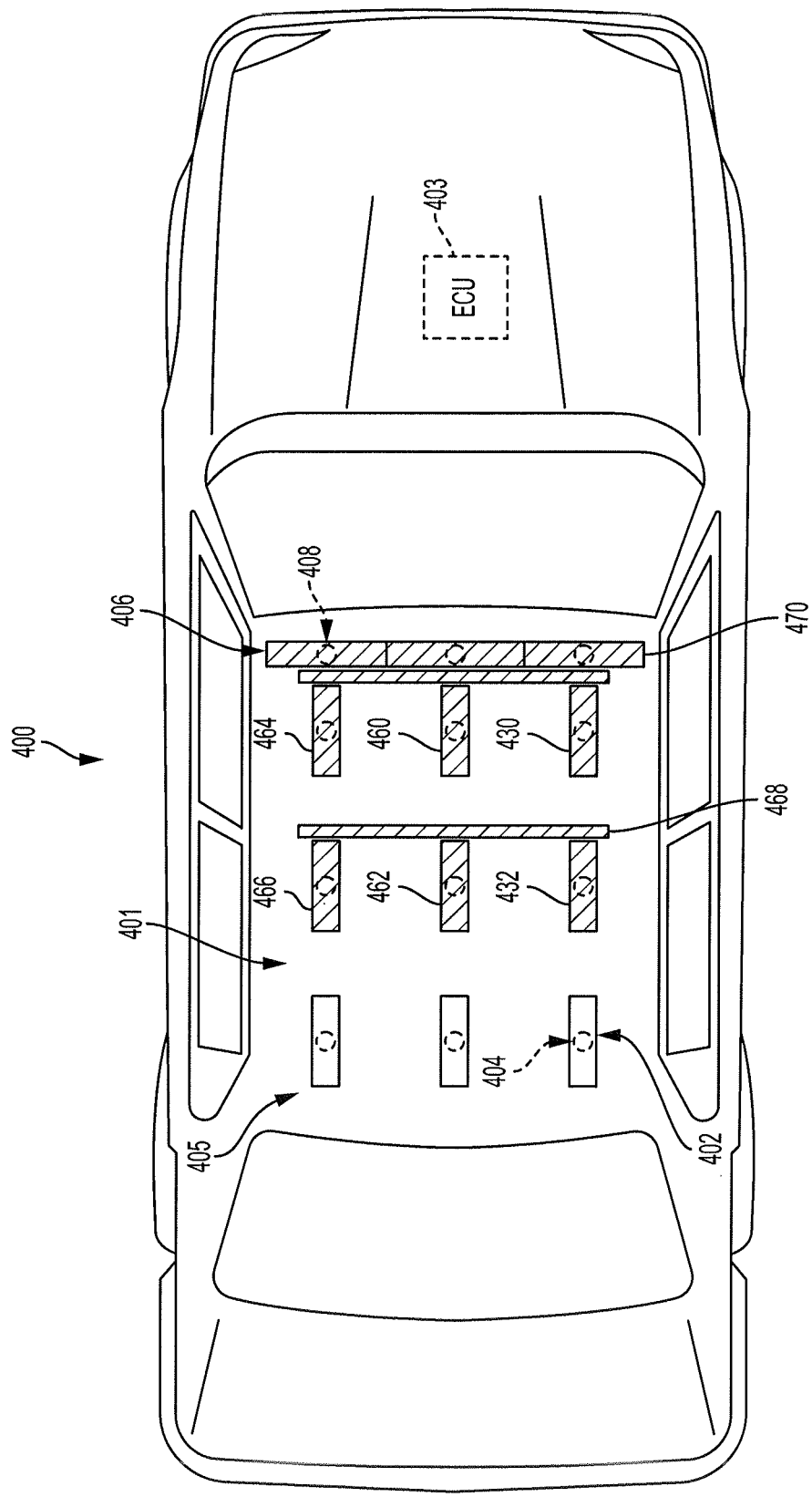

HIDEAWAY ROOF RACK FOR FUEL ECONOMY

BACKGROUND

1. Field

The present disclosure relates to systems and methods for providing automatic roof rack functionality, and automatic air braking functionality for a vehicle.

2. Description of the Related Art

Many vehicles may be equipped with a roof rack. It may be relatively time-consuming to install or remove a roof rack of a vehicle. However, it is undesirable to drive with a roof rack if the roof rack functionality is not required. This is because roof racks may increase wind resistance of a vehicle, thus decreasing fuel or energy efficiency of the vehicle. In addition, roof racks are generally not very good looking and therefore not desirable to be showing when not in use.

Different roof racks may be specifically designed for certain functionality such as transporting luggage, transporting bicycles, transporting canoes or kayaks, or the like. However, many roof racks are incapable of performing multiple functions such as supporting a bicycle one day and luggage the next. Due to the relative difficulty of replacing a roof rack, many people opt to only install a roof rack for a function that they will use most often and fail to receive the alternative functionality.

Roof racks can also be used on electric and hybrid vehicles. Many electric and hybrid vehicles convert braking force into electrical energy for storage in a battery using a motor-generator. However, a vehicle battery may only be capable of receiving energy at or below a threshold energy transfer rate. If an amount of braking that exceeds this threshold energy transfer rate is requested, then friction brakes of the vehicle may be engaged. It may be undesirable to solely use these friction brakes as their use results in wear and tear of brake pads. Thus, use of friction brakes may result in an expense to the driver because the brake pads will eventually need to be replaced.

In that regard, systems and methods for providing an automatic and configurable roof rack that also provides air braking to a vehicle are desirable.

SUMMARY

Described herein is a vehicle. The vehicle includes a body having a roof that defines a volume and includes a top surface. The vehicle further includes a plurality of support members. The vehicle further includes a plurality of actuators each coupled to at least one of the plurality of support members. The vehicle further includes an input device designed to receive user input corresponding to a desired roof rack configuration. The vehicle further includes an electronic control unit (ECU) coupled to the plurality of actuators and to the input device and designed to control the plurality of actuators to actuate at least one of the plurality of support members to be in a raised position in which it extends above the top surface of the roof or to be in a stored position in which it is located in the volume based on the desired roof rack configuration.

Also disclosed is another vehicle. The vehicle includes a body having a roof that defines a volume and includes a top surface. The vehicle further includes a plurality of support members. The vehicle further includes at least one locking mechanism coupled to the roof and designed to lock at least one of the plurality of support members in each of a raised position in which the at least one of the plurality of support members extends above the top surface of the roof or in a stored position in which the at least one of the plurality of support members is located in the volume to provide a desired roof rack configuration.

Also disclosed is another vehicle. The vehicle includes a body having a roof that defines a volume and includes a top surface. The vehicle further includes a roof rack. The roof rack may be integrated into or positioned within the body of the vehicle. The vehicle further includes a rack actuator coupled to the roof rack and to the body. The vehicle further includes a braking flap coupled to the roof at a location towards a front of the body. The vehicle further includes a brake actuator coupled to the braking flap and to the body. The vehicle further includes an input device designed to receive user input. The vehicle further includes an electronic control unit (ECU) coupled to the rack actuator, the brake actuator, and the input device, and designed to control the rack actuator to actuate the roof rack to be in a raised position in which it extends above the top surface of the roof or to be in a stored position in which it is located in the volume based on the user input, to identify a current driving condition, and to move the braking flap between a braking position in which it is raised above the roof in order to apply braking force to the body and a lowered position in which it is at least one of stored in the volume of the roof or located flush with the roof based on the current driving condition.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 4A, 4B, and 4C illustrate a vehicle having a modular roof rack that can be automatically or manually reconfigured according to an embodiment of the present invention;

DETAILED DESCRIPTION

The present disclosure describes systems and methods for providing an automatic and modular roof rack of a vehicle, for increasing aerodynamics of a vehicle having a roof rack, and for providing air braking for a vehicle. The systems and methods provide various benefits and advantages such as increased energy efficiency. The roof rack may be stored in a volume of the roof and only raised when desired, thus reducing wind resistance and increasing energy efficiency. The roof rack may be integrated into or positioned within the body of the vehicle. Additionally, a flap may be extended around the front of the roof rack and any load thereon, thus increasing aerodynamics of the vehicle and increasing energy efficiency.

The systems provide the additional benefit of having a roof rack that provides multiple functions. The roof rack may be modular, allowing for it to be configured and reconfigured based on the desired cargo to be stored on the roof rack. This further increases energy efficiency because the entire roof rack need not be raised, thus reducing wind resistance. The systems further provide the benefit and advantage of providing air braking or deflection of air for the vehicle. This desirably reduces the likelihood of damage to the battery by charging it too fast, and reduces wear and tear on friction brakes of the vehicle.

An exemplary system includes a modular roof rack, a braking flap, an aerodynamic flap, and actuators coupled to the modular roof rack and the flaps. The actuators may include rack actuators coupled to support members of the modular roof rack, a brake actuator coupled to the braking flap, and an aerodynamic actuator coupled to the aerodynamic flap. The actuators may actuate the support members and the flaps between a raised position and a lowered position. An electronic control unit (ECU) may be coupled to the actuators and may control the actuators based on received input and a current driving status of the vehicle. For example, a user may provide a desired functionality of the modular roof rack, and the ECU may control the rack actuators to raise the support members that provide the desired functionality. As another example, the ECU may determine that the battery is charging at a maximum charging rate and additional braking is desirable, and may control the brake flap to provide air braking for the vehicle.

Figure 1:
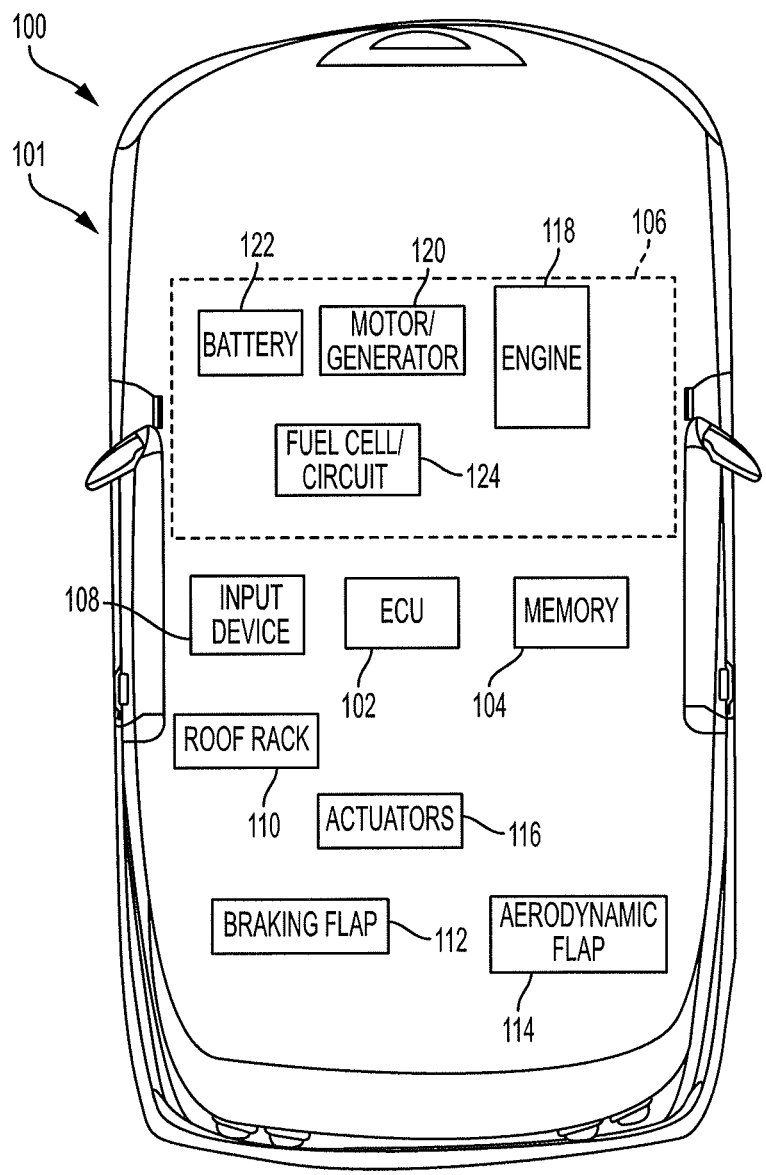
FIG. 1 is a block diagram illustrating a vehicle that includes a system for providing an automatic and modular roof rack and for providing air braking according to an embodiment of the present invention.

Turning to FIG. 1, a vehicle 100 includes a system 101 for providing a hideaway roof rack and a braking flap for increasing fuel or battery efficiency and increasing a brake life of the vehicle 100. The vehicle 100 (or system 101) may include an ECU 102, a memory 104, and a power source 106. The vehicle 100 (or system 101) may further include an input device 108, a hideaway roof rack 110, a braking flap 112, an aerodynamic flap 114, and one or more actuator 116.

The power source 106 may include any one or more of an engine 118, a motor-generator 120, a battery 122, or a fuel-cell circuit 124. The engine 118 may convert a fuel into mechanical power for propelling the vehicle 100. In that regard, the engine 118 may be a gasoline engine, a diesel engine, or the like.

The battery 122 may store electrical energy. In some embodiments, the battery 122 may include any one or more energy storage device including a battery, a flywheel, a super capacitor, a thermal storage device, or the like.

The fuel-cell circuit 124 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel-cell circuit 124 may be stored in the battery 122 and/or used by the motor-generator 120. In some embodiments, the vehicle 100 may include multiple fuel-cell circuits including the fuel-cell circuit 124.

The motor-generator 120 may convert the electrical energy stored in the battery 122 (or electrical energy received directly from the fuel-cell circuit 124) into mechanical power usable to propel the vehicle 100. The motor-generator 120 may further convert mechanical power received from the engine 118 or from wheels of the vehicle 100 into electricity, which may be stored in the battery 122 as energy and/or used by other components of the vehicle 100. In some embodiments, the motor-generator 120 may include a motor without a generator portion and, in some embodiments, a separate generator may be provided.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operation of components based on the determinations.

The vehicle 100 may be fully autonomous or semi-autonomous. In that regard, the ECU 102 may control various aspects of the vehicle 100 (such as steering, braking, accelerating, or the like) to maneuver the vehicle 100 from a starting location to a destination.

The memory 104 may include any non-transitory memory and may be capable of storing data usable by the ECU 102. For example, the memory 104 may store instructions usable by the ECU 102 to navigate the vehicle 100 from a starting location to a destination, or the like. The memory 104 may store other data usable by the ECU 102 such as charge transfer limitations of the battery 122 (i.e., a rate of electricity that can be received or provided by the battery 122 without causing harm to the battery 122), configurations of the roof rack 110 that provide desirable storage capabilities, or the like.

The input device 108 may include any input device capable of receiving user input. For example, the input device 108 may include a touchscreen, a keyboard, a mouse, a microphone, or the like.

The roof rack 110 may include any roof rack or components thereof that may provide the ability to store one or more item on a roof of the vehicle 100. The roof rack 110 may be considered a hideaway roof rack, or a retractable roof rack. In that regard, the roof rack 110 may be stored within a compartment of the vehicle 100 when not in use and extend to or above a roof of the vehicle 100 when use of the roof rack 110 is desired. In some embodiments, the roof rack 110 may be controlled by the ECU 102 to be in the stored position or the raised position based on user input received by the input device 108. In some embodiments, a user may manually move the roof rack 110 between the stored position and the raised position.

The braking flap 112 may include any component that extends into an airflow that is directed around a body of the vehicle 100. For example, the braking flap 112 may include plastic, fabric supported by a frame, or the like. The braking flap 112 may be controlled to extend into the airflow or to be stored in a storage location in which minimal interference with the airflow around the body is experienced.

The aerodynamic flap 114 may include any component that directs an airflow over the roof rack 110 or a load stored on the roof rack 110. For example, the aerodynamic flap 114 may include plastic, fabric supported by a frame, or the like. The aerodynamic flap 114 may be controlled to direct the airflow over the roof rack 110 or the load, or to be stored in a storage location in which minimal interference with the airflow around the body is experienced.

The actuators 116 may include one or more actuator designed to actuate the roof rack 110, one or more actuator designed to actuate the braking flap 112, and one or more actuator designed to actuate the aerodynamic flap 114. The actuators 116 may be electrically coupled to the ECU 102 and may be controlled via an electronic signal received from the ECU 102. For example, the ECU 102 may receive user input via the input device 108 that indicates a desired configuration of the roof rack 110, and the ECU 102 may control the actuators 116 to cause the roof rack 110 to achieve the desired configuration. Similarly, one or more sensor may provide information corresponding to a status of the roof rack 110 and any load positioned thereon. The ECU 102 may receive this detected data and may control the aerodynamic flap 114 to direct air around the roof rack 110 and any load based on the detected data. Similarly, the ECU 102 may determine a current driving condition (such as an amount of current being provided to the battery 122) and may determine whether additional braking is desirable. The ECU 102 may control the actuators 116 to raise the braking flap 112 if additional vehicle braking is desirable.

Figure 2A:
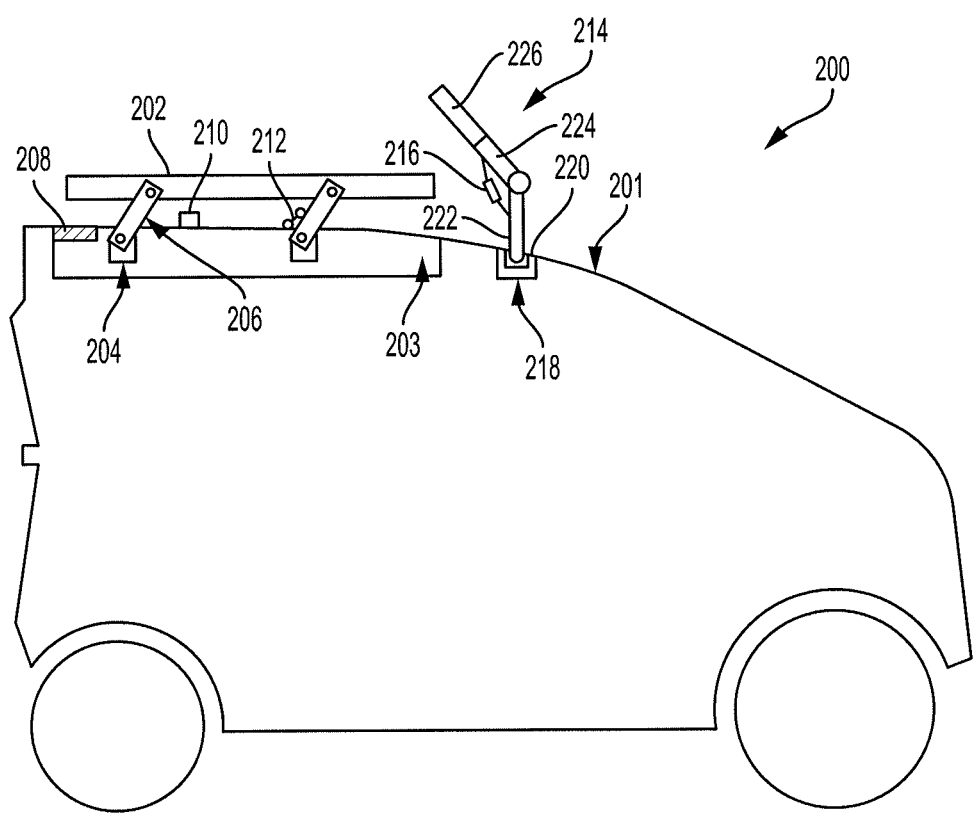
FIGS. 2A and 2B are drawings illustrating a vehicle having an automatic roof rack and a braking flap that provides air braking and aerodynamics for the automatic roof rack according to an embodiment of the present invention.
Figure 2B:
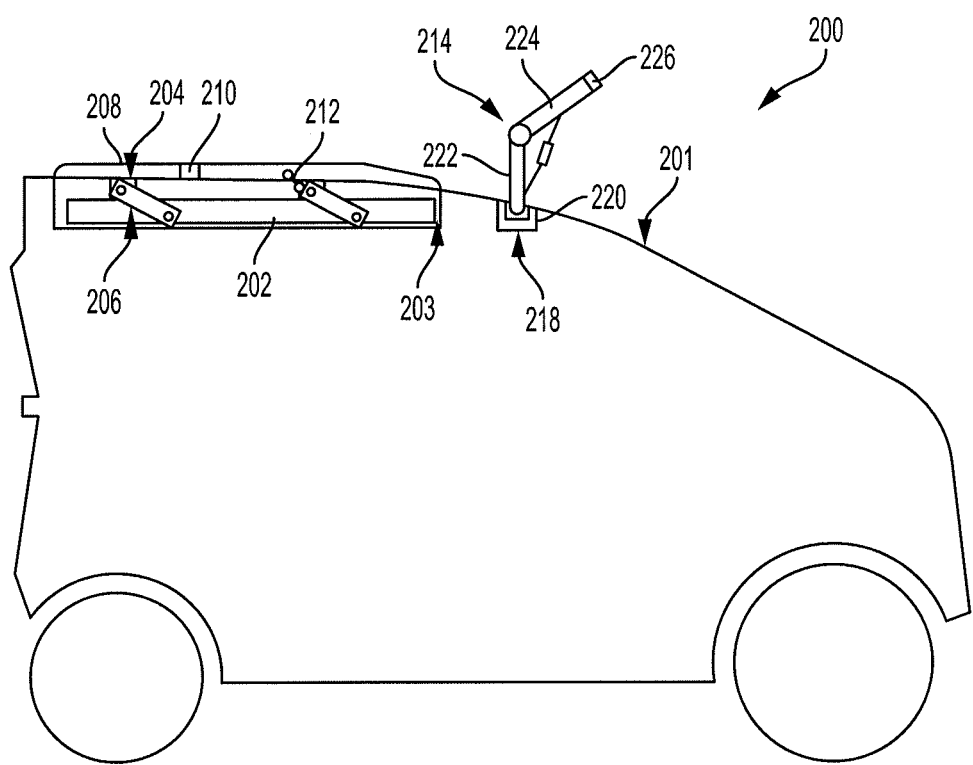

Referring now to FIGS. 2A and 2B, another vehicle 200 is shown. The vehicle 200 has a body that includes a roof 201 that defines a volume 203. The vehicle 200 further includes a roof rack 202, one or more actuator 204, and one or more linkage 206 coupled to the actuator 204 and the roof rack 202. An ECU of the vehicle 200 may be coupled to the actuator 204 and may control the actuator 204 to raise the roof rack 202 between a raised position (in which the roof rack 202 extends above a top surface of the roof 201, as shown in FIG. 2A) and a stored position (in which the roof rack 202 is located in the volume 203, as shown in FIG. 2B). For example, a user may use an input device to provide input regarding whether it is desired for the roof rack 202 to be in the raised position or in the stored position. Based on this input, the ECU may control the actuator 204 to raise or lower the roof rack 202 between the raised position and the stored position.

The actuator 204 may include any actuator capable of moving the roof rack 202 between the raised position in the stored position. For example, the actuator 204 may include a hydraulic actuator, an electric motor, a piezoelectric actuator, a linear actuator, a rotary actuator, or the like. In some embodiments, the linkage 206 may be excluded and the actuator 204 may directly actuate the roof rack 202.

The vehicle 200 also includes a retractable cover 208 that is designed to enclose the volume 203. For example, the ECU may control the retractable cover 208 to be in a retracted position (as shown in FIG. 2A) in response to the roof rack 202 being in the raised position, and may control the retractable cover 208 to enclose the volume 203 (as shown in FIG. 2B) in response to the roof rack 202 being in the stored position. The retractable cover 208 may include any material such as a plastic, a fabric supported by a frame, or the like. The retractable cover 208 may reduce wind resistance of the vehicle 200 when the roof rack 202 is in the stored position. In that regard, by controlling the roof rack 202 to be in the stored position and the retractable cover 208 to enclose the volume 203, wind resistance of the vehicle 200 may be reduced relative to a vehicle with a conventional roof rack, thus increasing efficiency of the vehicle 200. In turn, when storage of one or more object on the roof 201 of the vehicle is desired, the ECU may control the actuator 204 to raise the roof rack 202 to provide such storage.

The vehicle 200 may further include a locking mechanism 212. The locking mechanism 212 may lock the roof rack 202 in place in the raised position or the stored position. The locking mechanism 212 may include any locking mechanism such as a latch, a bolt, a pin, a strut, or the like. For example, a strut may be latched to the roof 201 and the roof rack 202 in order to maintain the position of the roof rack 202 in the raised position or the stored position. When it is desired for the roof rack 202 to switch positions, the locking mechanism 212 may be released, the position of the roof rack 202 may be changed, and the locking mechanism 212 may be re-engaged to the roof rack 202 and the roof 201.

In some embodiments, the roof rack 202 may be manually actuated between the raised position and the stored position. In that regard, a user may move the retractable cover 208 from the volume 203 and lift the roof rack 202 into the raised position, or may lower the roof rack 202 into the stored position and move the retractable cover 208 to cover the volume 203. In some embodiments, the locking mechanism 212 may be automatically controlled by the ECU or may be manually controlled by a user. In that regard, after controlling the roof rack 202 to be in the desired position, the user may manually engage the locking mechanism 212 to lock the roof rack 202 in the desired position (or the ECU may engage the locking mechanism).

The vehicle 200 may further include a braking flap 214 that may be stored within a brake volume 218 or extended above the roof 201. In some embodiments, the braking flap 214 may be located on the roof 201 towards a front of the vehicle 200.

One or more actuator may be coupled to the braking flap 214. For example, a brake actuator 220 may be coupled to the braking flap 214 and may move the braking flap 214 between a lowered position (in which the braking flap 214 is stored within the brake volume 218) and a braking position (in which the braking flap 214 is raised above the roof 201). Additionally, a position actuator 216 may be used to actuate the braking flap 214 between a braking position (in which the braking flap 214 applies a braking force to the vehicle 200, as shown in FIG. 2B) and an aerodynamic position (in which the braking flap 214 directs air over the roof rack 202, as shown in FIG. 2A). Each of the brake actuator 220 and the position actuator 216 may include a hydraulic actuator, an electric motor, a piezoelectric actuator, a linear actuator, a rotary actuator, or any other actuator.

The braking flap 214 may include a base portion 222, a first upper portion 224, and a second upper portion 226. The base portion 222 may be located on or coupled to the roof 201, and the upper portions 224, 226 may extend away from the base portion 222. The position actuator 216 may actuate the upper portions 224, 226 relative to the base portion 222. For example, the position actuator 216 may control the upper portions 224, 226 to extend forward of the base portion 222 in order to move the braking flap 214 to the braking position, and may control the upper portions 224, 226 to extend rear from the base portion 222 in order to move the braking flap 214 to the aerodynamic position.

When the braking flap 214 is in the aerodynamic position, the braking flap 214 may direct air over the roof rack 202 and potentially any load or cargo that is positioned on the roof rack 202. In some embodiments, the vehicle 200 may include a sensor 210. The sensor 210 may include, for example, a camera, a radar sensor, a LIDAR sensor, a proximity sensor, or the like. The sensor 210 may detect data corresponding to the roof rack 202 such as whether the roof rack 202 is in the raised position or the stored position, whether cargo is located on the roof rack 202, a location of the cargo relative to the roof 201, or the like. The ECU of the vehicle may control the braking flap 214 to be in the aerodynamic position when the roof rack 202 is in the raised position or when cargo is located on the roof rack 202.

In some embodiments, the second upper portion 226 of the braking flap 214 may actuated (such as by the ECU) to extend towards or away from the base portion 222. For example, the sensor 210 may detect a distance from the roof 201 to the top of cargo on the roof rack 202, and the ECU may control the second upper portion 226 of the braking flap 214 to extend to or above the top of the cargo in order to direct air over the entire cargo. Similarly, if no cargo is located on the roof rack 202, or if low-positioned cargo is on the roof rack 202, the ECU may control the second upper portion 226 to retract or telescope within the first upper portion 224 to reduce the amount of air that is displaced above the vehicle 200.

When the braking flap 214 is in the braking position, it may increase wind resistance of the vehicle 200 and provide braking force to the vehicle 200. This may be advantageous in various situations instead of applying brakes via friction brakes. For example, optimal braking may be provided by the motor-generator which may convert mechanical energy of the vehicle into electrical energy for storage in the battery. However, the battery may only be capable of receiving electrical energy at or below a threshold rate of charge. The threshold rate of charge may be a rate of charge above which the battery may become damaged.

If the vehicle is requested to brake at such a force so as to provide electrical energy to the battery at or above the threshold rate of charge then the ECU may determine that additional braking (in addition to braking by the motor-generator) is desirable. Conventional vehicles may apply this braking via friction brakes. However, such braking via friction brakes may wear down the friction brakes, which may be relatively expensive to replace. In that regard, an ECU of the vehicle 200 may control the brake actuator 220 to raise the braking flap 214 into the braking position to apply additional braking which may reduce the likelihood of wear and tear on the friction brakes of the vehicle 200. Additionally, the ECU may control extension or telescoping of the second upper portion 226 based on an amount of additional braking that is desirable.

Figure 3A:
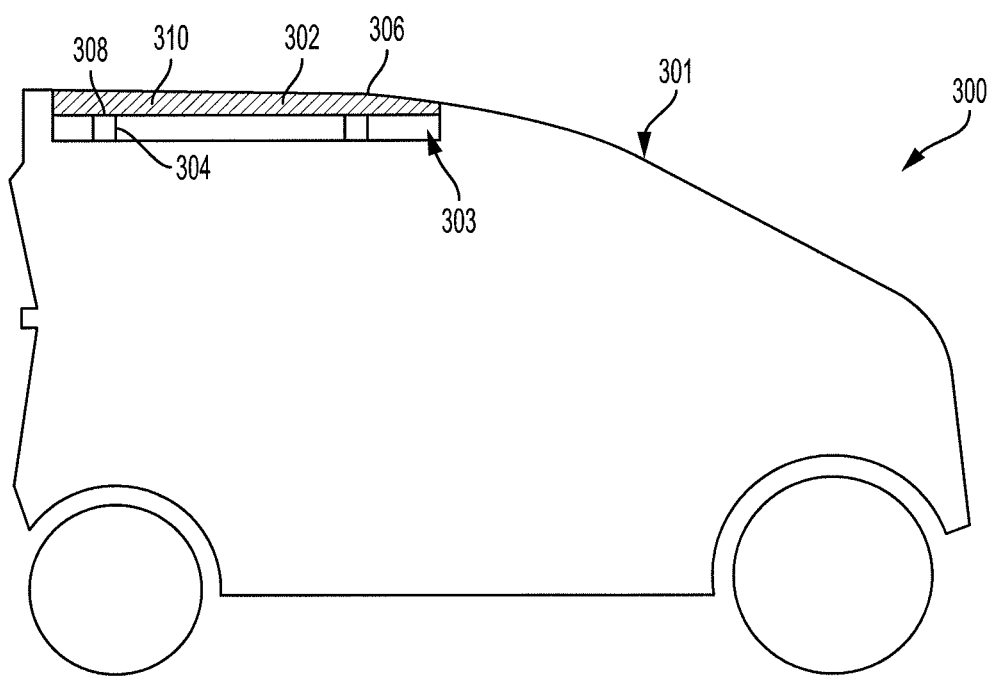
FIGS. 3A, 3B, and 3C are drawings illustrating a vehicle having an automatic roof rack that has a removable portion that can be replaced to provide alternative functionality according to an embodiment of the present invention.
Figure 3B:
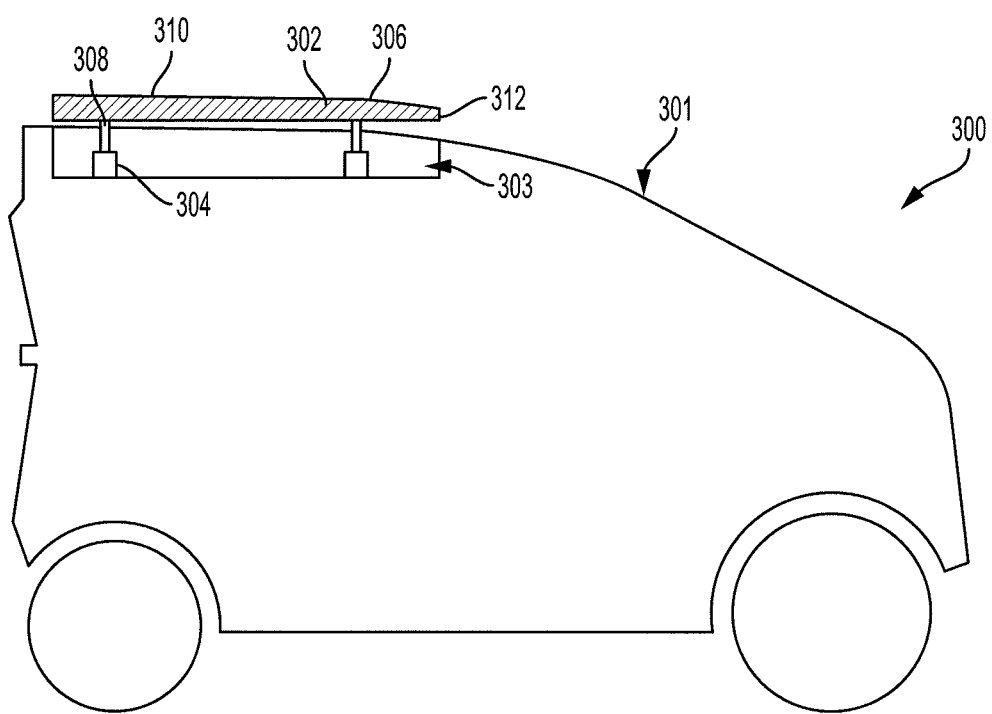

Referring now to FIGS. 3A and 3B, another vehicle 300 is shown. The vehicle 300 includes a body having a roof 301 that defines a volume 303. The vehicle 300 further includes a roof rack 302 that is designed to fit within the volume 303. The vehicle 300 further includes one or more rack actuator 304 that is designed to move or actuate the roof rack 302 between a raised position (as shown in FIG. 3B) and a stored position (as shown in FIG. 3A).

The roof rack 302 has a rack top surface 306. The rack top surface 306 may be positioned flush with the top surface of the roof 301 when the roof rack 302 is in the stored position, as shown in FIG. 3A. Additionally, the rack top surface 306 may be continuous with the top surface of the roof 301 when the roof rack is in the stored position. The rack top surface 306 may be designed to make the vehicle 300 aerodynamic when the roof rack is in the stored position.

Additionally, design of the rack top surface 306 and a front end 312 of the roof rack 302 may be designed to be aerodynamic when the roof rack is in the raised position. For example, the rack top surface 306 and the front end 312 may be designed to reduce wind resistance caused by the roof rack 302. As an example, the front end 312 may be designed to direct air up and over the roof rack 302 when the roof rack 302 is in the raised position.

The roof rack 302 may include a base portion 308 and a removable portion 310. The base portion 308 may be coupled to the rack actuator 304, or may be integral with the rack actuator 304. The removable portion 310 may be removably coupled to the base portion 308 such as, for example, via screw threading, a spring clip, a latch, or the like. Therefore, the removable portion 310 may be removed from the base portion 308 relatively easily.

Figure 3C:
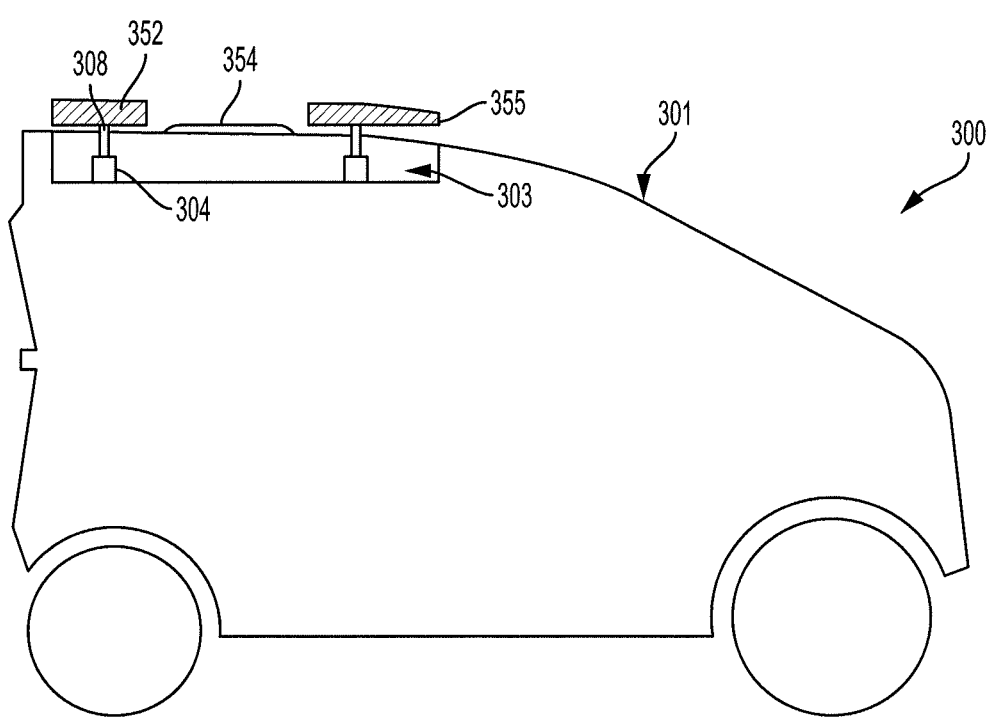

In that regard in referring to FIG. 3C, another removable portion 352 may be removably coupled to the base portion 308 when roof rack functionality that is different than that provided by the removable portion 310 of FIG. 3A is desired. The removable portion 310 of FIG. 3A may be removed from the base portion 308, and the removable portion 352 may be coupled to the base portion 308 to provide the functionality of the removable portion 352. For example, the removable portion 310 may be ideal for transporting luggage, and the removable portion 352 may be ideal for transporting bicycles.

The vehicle 300 may further include an insert 354. The insert 354 may extend from the removable portion 352 to another removable portion 355. When the removable portions 352, 355 are in the stored position, the insert 354 may encapsulate the volume 303 along with the removable portions 352, 355. In some embodiments, the insert 354 may be manually inserted and attached by a user and, in some embodiments, the insert 354 may be automatically inserted or positioned by the ECU. The insert 354 may direct airflow over the roof 301, thus increasing aerodynamics of the vehicle 300.

Figure 4A:
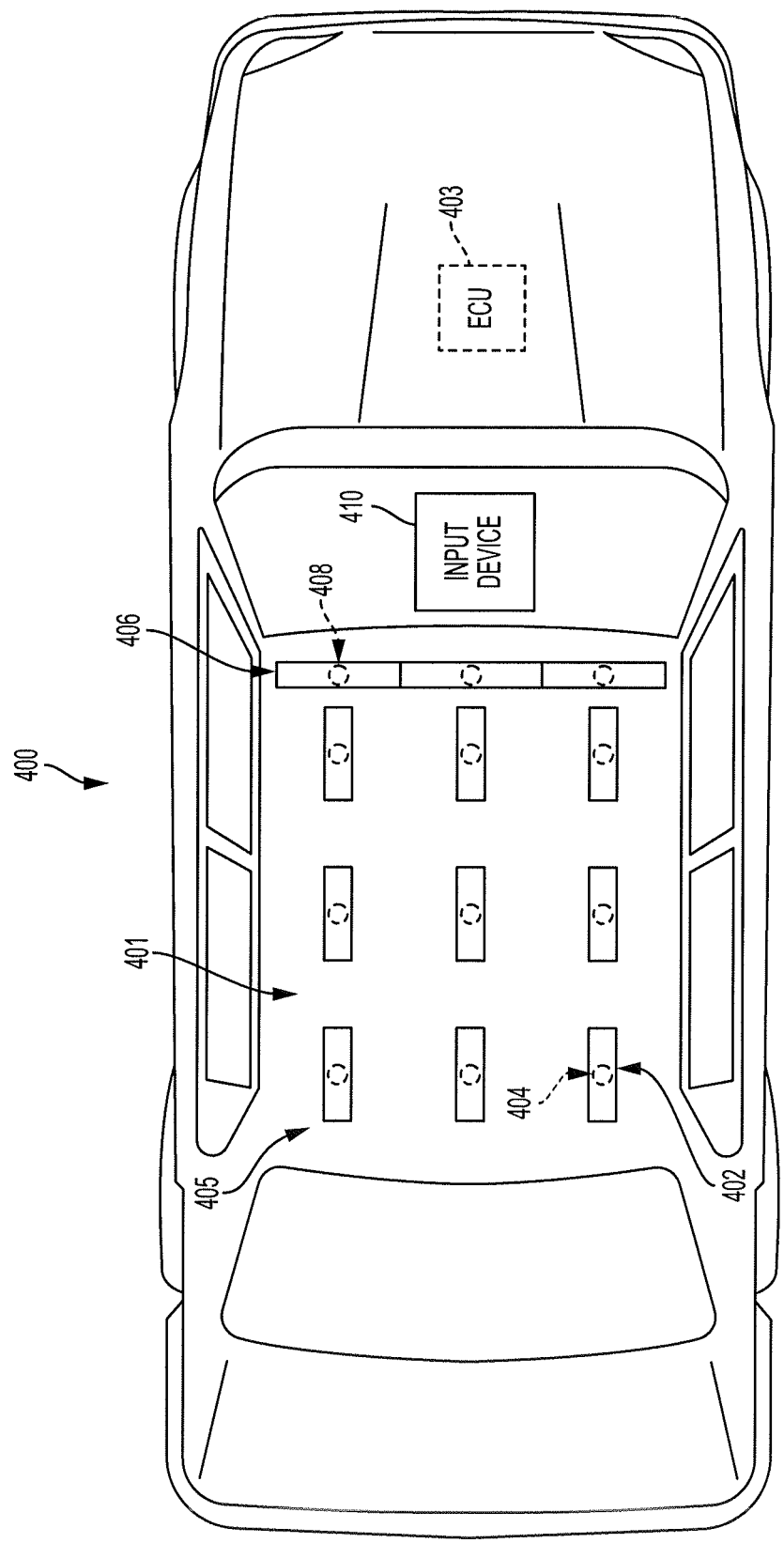

Referring now to FIG. 4A, another vehicle 400 includes a vehicle body having a roof 401 and a modular roof rack 405 located on the roof 401. The modular roof rack 405 may include a plurality of support members 402 each coupled to the roof 401 via a plurality of actuators 404. The vehicle 400 further includes a plurality of aerodynamic flaps 406 coupled to the roof 401 with aerodynamic actuators 408. The vehicle 400 may further include an ECU 403 coupled to the plurality of rack actuators 404 and the plurality of aerodynamic actuators 408. The vehicle 400 may further include an input device 410 coupled to the ECU 403.

The input device 410 may be capable of receiving user input corresponding to a desired configuration of the modular roof rack 405. For example and referring to FIGS. 4A and 5A, the input device 410 may include a touchscreen 500. The touchscreen 500 may output a representation 502 of the modular roof rack 405. A user may select any one or more of a plurality of representations 504 of each of the support members 402. The ECU 403 may receive the selection of the one or more representations 504 of each of the support members 402 and may control the corresponding actuators 404 to cause the selected support members 402 to be actuated to the raised position.

Figure 4B:
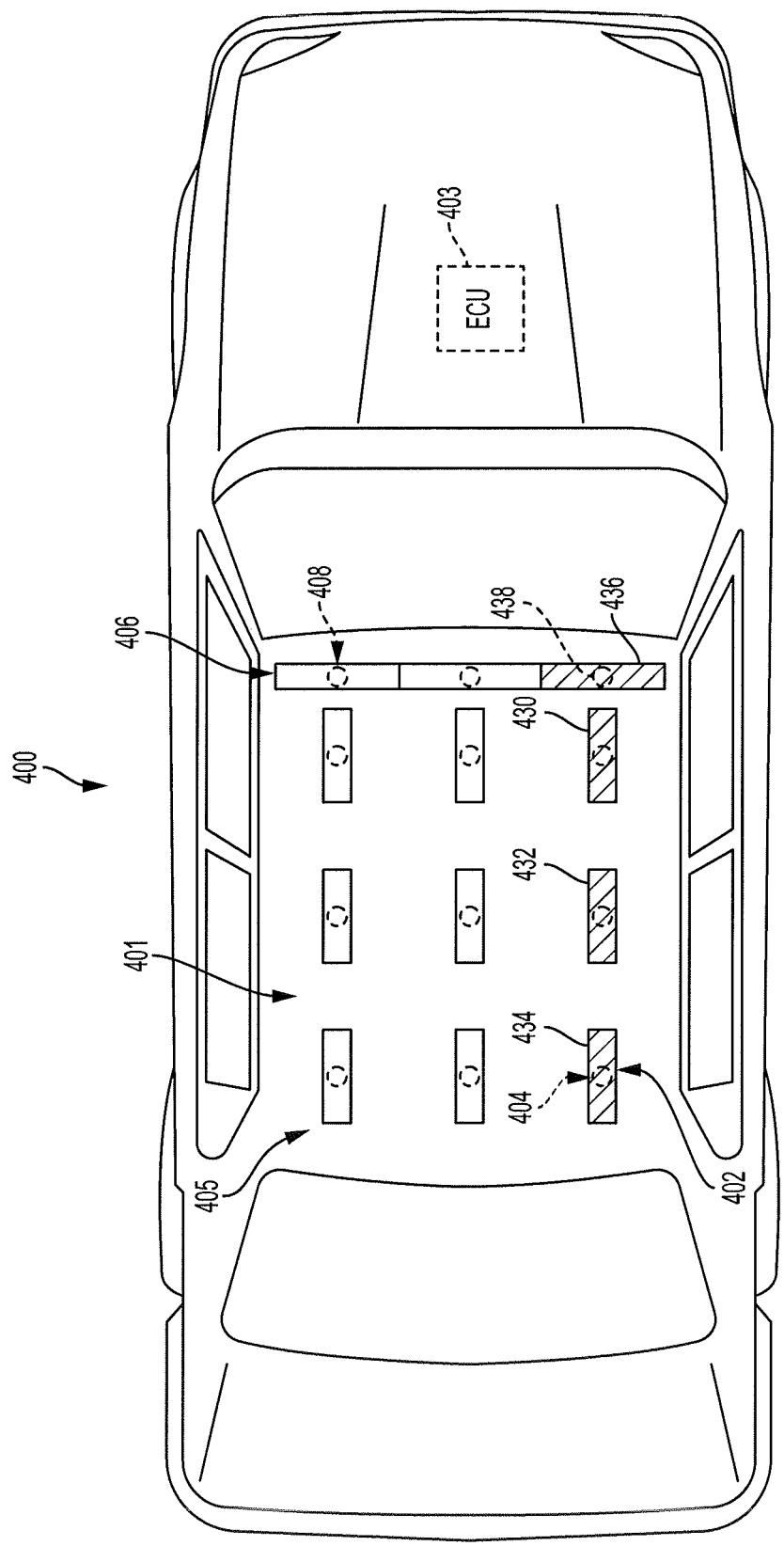
Figure 5A:
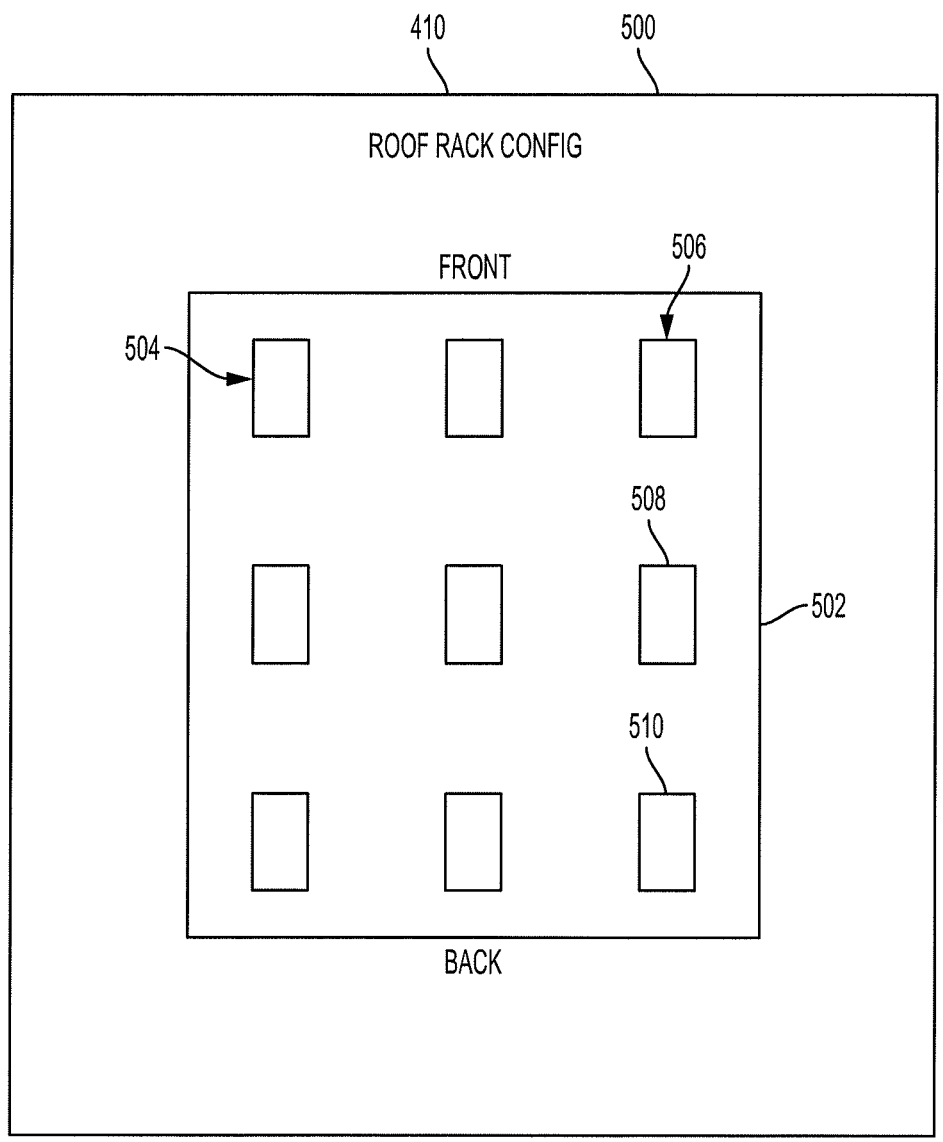
FIG. 5A illustrates an exemplary touchscreen that may be used as an input device for the vehicle of FIGS. 4A, 4B, and 4C according to an embodiment of the present disclosure.

For example and referring now to FIGS. 4B and 5A, a user may touch the touchscreen 500 at a first location 506, a second location 508, and a third location 510 that corresponds to a first support member 430, a second support member 432, and a third support member 434. The ECU 403 may receive this user input. Based on the user input, the ECU 403 may control the actuators 404 that correspond to the first support member 430, the second support member 432, and the third support member 434 to cause the support members 430, 432, 434 be in a raised position (in a similar manner as the roof rack 202 of FIG. 2A). In that regard, a user may select desirable support members 402 and may cause only the desirable support members to be in the raised position.

In some embodiments, a user may manually raise the support members 430, 432, 434 and may lock them in place using a locking mechanism similar to the locking mechanism 212 of FIG. 2A. In some embodiments, the ECU 403 may be capable of identifying which support members 402 are in the raised position and which support members 402 are in the stored position. Regardless of whether the ECU 403 or a user controls the position of the support members 402, the ECU 403 may control the aerodynamic flaps based on the position of the support members 402.

As shown in FIG. 4B, the support members 430, 432, 434 are in the raised position. The ECU 403 may determine that these support members 430, 432, 434 are in the raised position and may determine that a first aerodynamic flap 436 is longitudinally aligned with the support members 430, 432, 434. Based on this information, the ECU 403 may control an aerodynamic actuator 438 to raise the first aerodynamic flap 436 into the raised position. When the aerodynamic flap 436 is in the raised position, it may direct in airflow over the support members 430, 432, 434. Thus, the ECU 403 may raise any of the aerodynamic flaps 406 to direct air over any raised support members 402. The aerodynamic flaps 406 may extend up and away from the roof 401, and/or rearward from their location on the roof 401 (i.e., in a similar configuration as the braking flap 214 of FIG. 2A).

Figure 5B:
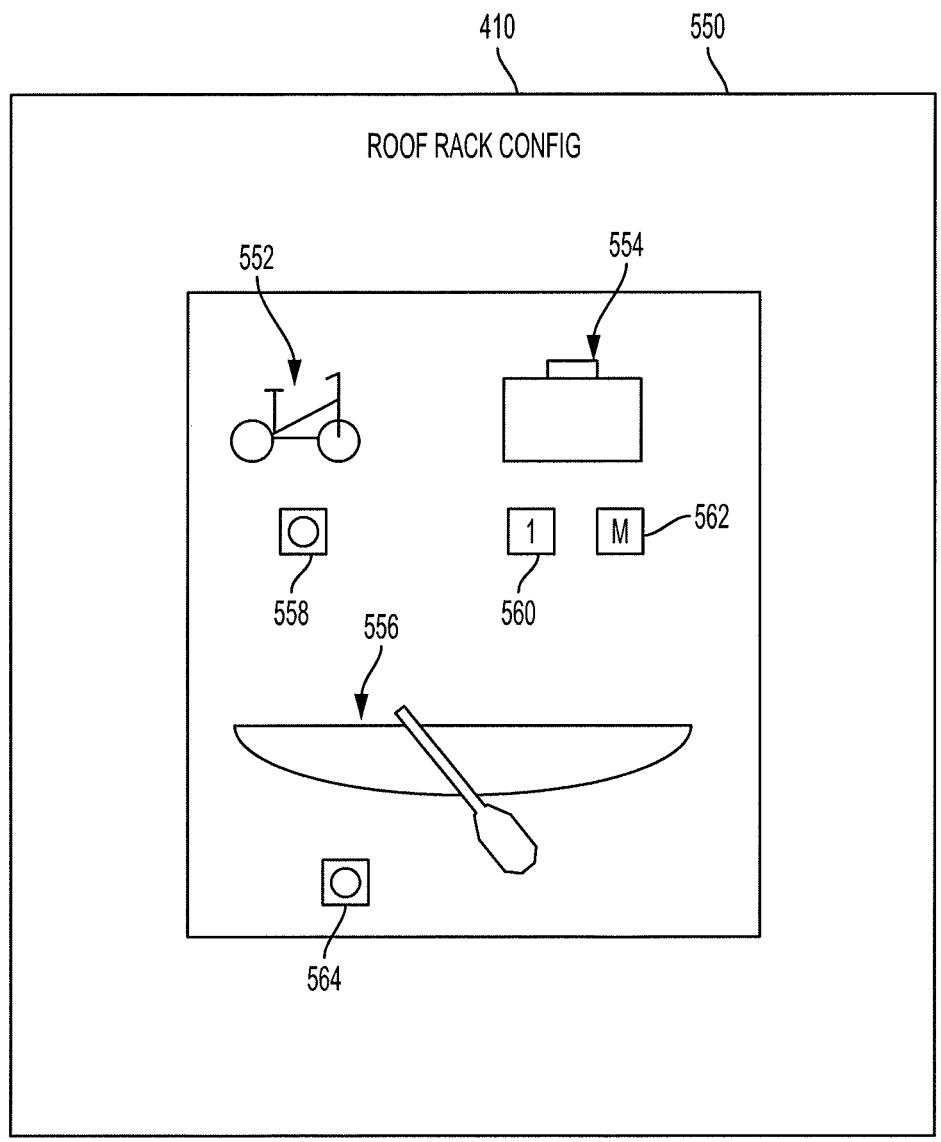
FIG. 5B illustrates another exemplary touchscreen that may be used as an input device for the vehicle of FIGS. 4A, 4B, and 4C according to an embodiment of the present disclosure.

Turning now to FIGS. 4C and 5B, the input device 410 may include another touchscreen 550. The touchscreen 550 may output representations of multiple objects that may be stored or transported on the modular roof rack 405. For example, the touchscreen 550 may output a representation of a bicycle 552, a representation of a suitcase 554, and a representation of a canoe or kayak 556. A user may select one or more of the representations to indicate that it is desirable for the modular roof rack 405 to be positioned in such a way so as to support the selected objects.

The user may be able to provide additional information corresponding to each of the objects. For example, an input location 558 may allow a user to select a quantity of bicycles that are desired to be supported by the modular roof rack 405. Additionally, an input location 560 may allow a user to select a quantity of suitcases that are desired to be supported by the modular roof rack 405, and another input location 562 may allow the user to select a size of the suitcase. Another input location 564 may allow a user to select a quantity of canoes or kayaks that are desired to be supported by the modular roof rack 405.

The ECU 403 may receive the input from the touchscreen 550 and may control the rack actuators 404 based on the received input. For example, a user may select the representation of the suitcase 554 and may indicate that one medium-size suitcase is to be stored on the modular roof rack 405. The ECU 403 may control the rack actuators 404 associated with support members 430, 432, 460, 462, 464, 466 to cause the support members 430, 432, 460, 462, 464, 466 to be in the raised position. The support members 430, 432, 460, 462, 464, 466 may be sufficient to support a medium sized suitcase.

The ECU 403 may further cause all of the aerodynamic flaps 406 to be in the raised position to direct air over the raised support members 430, 432, 460, 462, 464, 466, as each of the aerodynamic flaps 406 are longitudinally aligned with at least one of the raised support members 430, 432, 460, 462, 464, 466.

The vehicle 400 may further include crossbars 468, 470. The crossbars 468, 470 may be automatically controlled by the ECU 403 or may be manually attached by a user. The crossbars 468, 470 may provide extra support for supporting any object that is to be stored on the modular roof rack 405.

Figure 6:
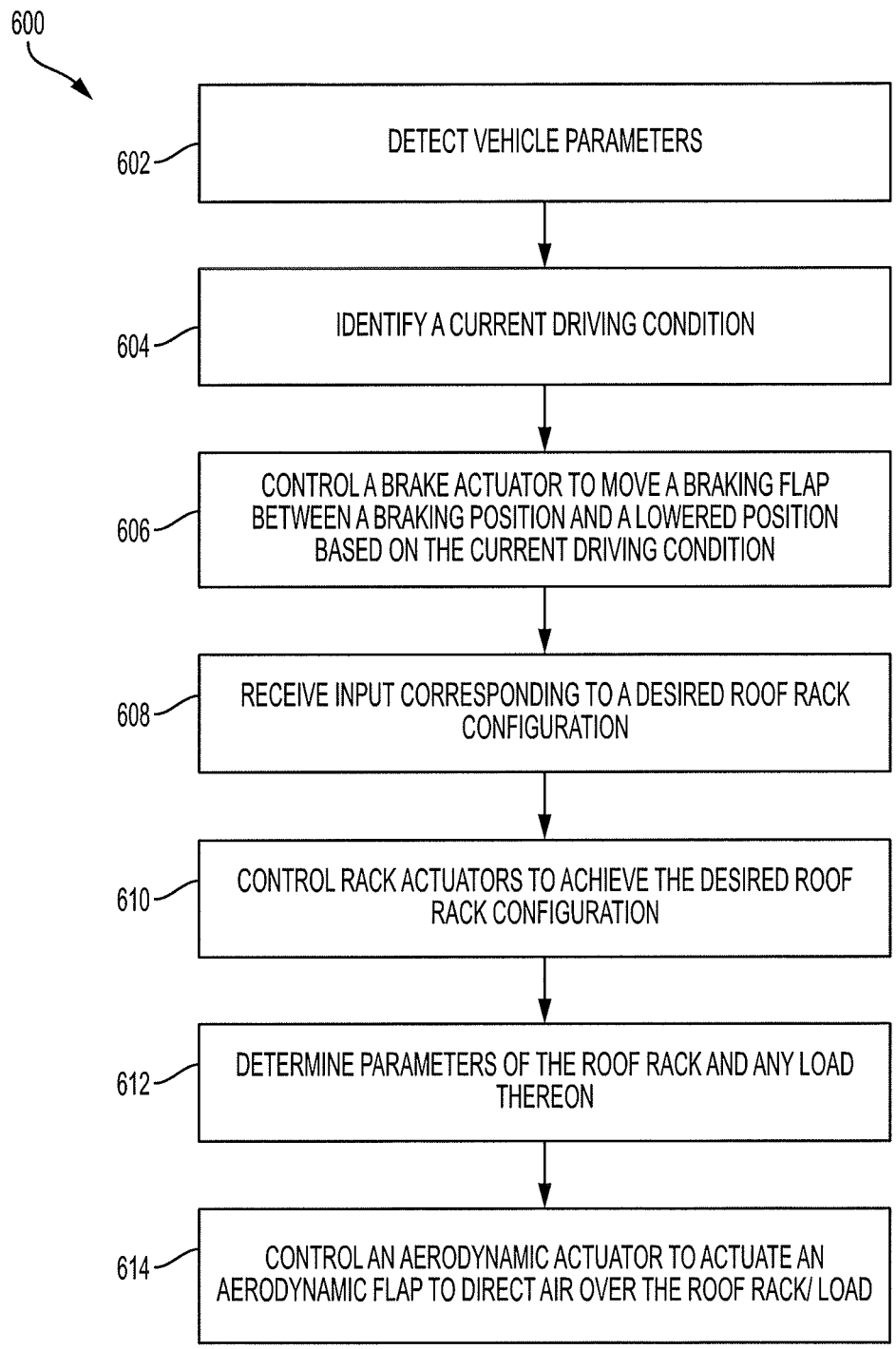
FIG. 6 is a flowchart illustrating a method for controlling a braking flap, an aerodynamic flap, and a modular roof rack of a vehicle according to an embodiment of the present disclosure.

Referring now to FIG. 6, a method 600 for controlling a modular roof rack and flaps of a vehicle is shown. The method 600 may be performed by components of a vehicle similar to the vehicle 100 of FIG. 1, the vehicle 200 of FIG. 2A, the vehicle 300 of FIG. 3A, or the vehicle 400 of FIG. 4A. For example, the method 600 may be performed by a logic device of the vehicle 200 such as an ECU.

In block 602, one or more sensor may detect vehicle parameters, or the ECU may identify specific vehicle parameters. For example, the vehicle parameters may correspond to a threshold rate of charge of a battery of the vehicle, an amount of vehicle braking that may be provided by a motor-generator of the vehicle, or the like. The vehicle parameters may be retrieved from a memory, may be received via an input device, or the like.

In block 604, the ECU may identify a current driving condition. For example, the ECU may identify whether the vehicle is braking, whether energy from the battery is being used by the motor-generator, a rate of charge or discharge of the battery, or the like. The ECU may make identify the current driving condition based on data received from one or more sensor, based on one or more calculation, or the like.

In block 606, the ECU may control a brake actuator based on the current driving condition. The ECU may control the brake actuator to move a braking flap between a braking position and a lowered position based on the current driving condition and the vehicle parameters. In particular, if the ECU determines that a current battery charge rate is equal to the threshold battery charge rate and additional braking is requested, then the ECU may control the brake actuator to move the braking flap to a braking position. Conversely, if the ECU determines that the current battery charge rate is less than the threshold battery charge rate then the ECU may ensure that the braking flap is in the lowered position.

In block 608, the ECU may receive input from an input device that corresponds to a desired roof rack configuration. The input may be received in any format such as via a touchscreen, a keyboard, a mouse, a microphone, or the like.

In block 610, the ECU may control rack actuators to actuate support members of a modular roof rack to achieve the desired roof rack configuration. For example, the ECU may control rack actuators to cause specific support members to be in a raised position and may cause other support members to be in a lowered position.

In block 612, the ECU may determine parameters of the roof rack and any load positioned on the roof rack. For example, these parameters may correspond to which support members are raised, a height of the support members above the roof, a height of the load above the roof, or the like. These parameters may be identified using one or more sensors such as a camera, a radar sensor, or the like.

In block 614, the ECU may control an aerodynamic actuator to actuate an aerodynamic flap to direct air over the roof rack or over the load based on the determined parameters in block 612. For example, the ECU may control the aerodynamic actuator to actuate the aerodynamic flap to have a height that is equal to or greater than a height of the load located on the roof rack to direct air over the load aerodynamically. In some embodiments, the ECU may instead control actuators coupled to a braking flap to cause the braking flap to function as an aerodynamic flap.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A vehicle, comprising:
    a body having a roof that defines a volume and includes a top surface;
    a plurality of support members;
    a plurality of actuators each coupled to at least one of the plurality of support members;
    an input device that receives user input corresponding to a desired roof rack configuration; and
    an electronic control unit (ECU) coupled to the plurality of actuators and to the input device and programmed to:
        receive the user input from the input device, and
        control the plurality of actuators individually to actuate at least one of the plurality of support members to be in a raised position in which it extends above the top surface of the roof or to be in a stored position in which it is located in the volume based on the desired roof rack configuration in order to achieve any of multiple roof rack configurations.

2. The vehicle of claim 1 wherein:
    the input device includes a touchscreen that outputs a representation of the plurality of support members and that receives input including a selection of specific support members of the plurality of support members; and
    the ECU is further programmed to control the plurality of actuators to actuate the specific support members to be in the raised position and to cause any remaining support members to remain in the stored position.

3. The vehicle of claim 1 wherein the volume includes multiple volumes that each house at least one of the plurality of support members.

4. The vehicle of claim 1 further comprising at least one locking mechanism coupled to the roof and that locks at least one of the plurality of support members in the raised position or in the stored position.

5. The vehicle of claim 1 further comprising a braking flap coupled to the roof at a location towards a front of the body, wherein:
    at least one of the plurality of actuators is a brake actuator and is coupled to the braking flap; and
    the ECU is further programmed to identify a current driving condition and to control the brake actuator to move the braking flap between a braking position in which it is raised above the roof in order to apply braking force to the body and a lowered position in which it is at least one of stored in the volume of the roof or located flush with the roof based on the current driving condition.

6. The vehicle of claim 5 wherein the ECU is further programmed to control the brake actuator to move the braking flap to an aerodynamic position in which it directs air over the plurality of support members when the at least one of the plurality of support members is in the raised position.

7. The vehicle of claim 1 further comprising an aerodynamic flap coupled to the roof at a location towards a front of the body, wherein:
    at least one of the plurality of actuators is a flap actuator and is coupled to the aerodynamic flap; and
    the ECU is further programmed to control the flap actuator to move the aerodynamic flap to direct air over the plurality of support members when the at least one of the plurality of support members is in the raised position.

8. The vehicle of claim 7 wherein:
    the aerodynamic flap includes multiple aerodynamic flaps;
    the flap actuator includes multiple flap actuators each coupled to at least one of the multiple aerodynamic flaps; and
    the ECU is programmed to control the multiple flap actuators to move aerodynamic flaps that are aligned with the at least one of the plurality of support members that is in the raised position to direct the air over the at least one of the plurality of support members, and to cause remaining aerodynamic flaps to be at least one of stored in the volume of the roof or located flush with the roof.

9. The vehicle of claim 1 wherein at least some of the plurality of support members include a rack top surface that lies flush with the top surface of the roof when the at least some of the plurality of support members are in the stored position.

10. The vehicle of claim 1 further comprising at least one cover that is located flush with the top surface of the roof and that encloses the plurality of support members within the volume when the plurality of support members are in the stored position.

11. A vehicle, comprising:
    a body having a roof that defines a volume and includes a top surface;
    a plurality of support members;
    an input device that receives user input corresponding to a desired roof rack configuration;
    a plurality of actuators that each actuate at least one of the plurality of support members between a raised position in which the at least one of the plurality of support members extends above the top surface of the roof and a stored position in which the at least one of the plurality of support members is located in the volume to provide the desired roof rack configuration; and
    an electronic control unit (ECU) coupled to the plurality of actuators and to the input device and programmed to:
        receive the user input from the input device, and
        control the plurality of actuators individually to actuate at least one of the plurality of support members to be in the raised position or in the stored position based on the desired roof rack configuration in order to achieve any of multiple roof rack configurations.

12. The vehicle of claim 11 wherein a support member of the plurality of support members includes a base portion that is coupled to the roof and a removable portion that is removably coupled to the base portion such that replacement removable portions can be installed on the base portion based on a desired use of the desired roof rack configuration.

13. The vehicle of claim 11 further comprising:
a braking flap coupled to the roof at a location towards a front of the body; and
a brake actuator coupled to the braking flap;
wherein the ECU is further coupled to the brake actuator and programmed to identify a current driving condition and to control the brake actuator to move the braking flap between a braking position in which it is raised above the roof in order to apply braking force to the body and a lowered position in which it is at least one of stored in the volume of the roof or located flush with the roof based on the current driving condition.

14. The vehicle of claim 13 further comprising:
a battery that stores energy; and
a motor-generator coupled to the battery and that generates electricity to be stored in the battery,
wherein:
the current driving condition includes a rate of electricity flow from the motor-generator to the battery, and
the ECU is programmed to control the brake actuator to move the braking flap to the braking position when the rate of electricity flow from the motor-generator to the battery is equal to a maximum rate of electricity flow and additional braking is desired.

15. The vehicle of claim 13 wherein the ECU is further programmed to control the brake actuator to move the braking flap to an aerodynamic position in which it directs air over the plurality of support members when the at least one of the plurality of support members is in the raised position.

16. The vehicle of claim 11 further comprising an aerodynamic flap coupled to the roof at a location towards a front of the body, and a flap actuator coupled to the aerodynamic flap, wherein the ECU is further programmed to control the flap actuator to move the aerodynamic flap to direct air over the plurality of support members when the at least one of the plurality of support members is in the raised position.

17. A vehicle, comprising:
a body having a roof that defines a volume and includes a top surface;
a roof rack that includes a plurality of support members and a plurality of rack actuators each coupled to at least one of the plurality of support members;
a braking flap coupled to the roof at a location towards a front of the body;
a brake actuator coupled to the braking flap and to the body;
an input device that receives user input corresponding to a desired roof rack configuration; and
an electronic control unit (ECU) coupled to the plurality of rack actuators, the brake actuator, and the input device, and programmed to control the plurality of rack actuators individually to actuate at least one of the plurality of support members to cause the roof rack to have the desired roof rack configuration, to identify a current driving condition, and to move the braking flap between a braking position in which it is raised above the roof in order to apply braking force to the body and a lowered position in which it is at least one of stored in the volume of the roof or located flush with the roof based on the current driving condition.

18. The vehicle of claim 17 wherein the roof rack includes a base portion that is coupled to the roof and a removable portion that is removably coupled to the base portion such that replacement removable portions can be installed on the base portion based on a desired use of the roof rack.

19. The vehicle of claim 17 wherein the ECU is further programmed to control the brake actuator to move the braking flap to an aerodynamic position in which it directs air over the roof rack when the roof rack is in the raised position.

20. The vehicle of claim 17 wherein the roof rack includes a rack top surface that lies flush with the top surface of the roof when the roof rack is in the stored position.

* * * * *